United States Patent Office 3,637,744
Patented Jan. 25, 1972

3,637,744
INDOLEAZOCINES
John P. Yardley, King of Prussia, and Herchel Smith, Wayne, Pa., assignors to American Home Products Corporation, New York, N.Y.
No Drawing. Filed Apr. 4, 1969, Ser. No. 813,712
Int. Cl. C07d 27/54
U.S. Cl. 260—326.9      6 Claims

ABSTRACT OF THE DISCLOSURE

This invention is concerned with 2,3,4,5,6,7-hexahydro-1H-indolo[5,4-b]azocines, derivatives thereof and their acid addition salts which are useful as central system depressants. Further, some of these compounds are useful intermediates in the preparation of other such compounds.

---

The present invention relates to new and novel indoleazocines. In particular, it is concerned with 2,3,4,5,6,7-hexahydro-1H-indolo[5,4-b]azocines, derivatives thereof and their acid addition salts which in accepted and standard pharmacological tests have exhibited central nervous system activity as depressants which are useful in producing a calming effect in animals. Further, many of these compounds are also useful as intermediates in the preparation of still other biologically active compounds.

wherein $R_1$ and $R_2$ are both selected from the group consisting of hydrogen, halogen, lower alkyl, and lower alkoxy; $R_3$ is selected from the group consisting of hydrogen, lower alkyl, lower di(lower)alkylamino(lower)alkyl, phen(lower)alkyl, phen(lower)alkanoyl, and halophen(lower)alkanoyl; $R_4$ is selected from the group consisting of hydrogen, lower alkyl, cyclo(lower)alkyl, phen(lower)alkyl, amino(lower)alkyl and guanidinium(lower)alkyl and the pharmacologically acceptable acid addition salts thereof. As employed herein the terms "lower alkyl," "lower alkoxy," "lower alkanoyl" and the like are meant to include both branched and straight chain hydrocarbon moieties containing from about one to about six carbon atoms. Typical examples of the compounds of this invention are: 3-benzyl-2,3,4,5,6,7-hexahydro-1H-indolo[5,4-b]azocine hydrochloride; 2,3,4,5,6,7-hexahydro-1H-indolo[5,4-b]azocine hydrochloride; 3-benzyl - 7 - (3-dimethylaminopropyl)-2,3,4,5,6,7-hexahydro - 1H - indolo[5,4-b]azocine hydrochloride; 7-(3-dimethylaminopropyl)-2,3,4,-5,6,7 - hexahydro - 1H - indolo[5,4-b]azocine dihydrochloride; [-(2,3,4,5,6,7 - hexahydro - 1H - indolo[5,4-b]indolyl)ethyl]guanidine nitrate; and [2-(2,3,4,5,6,7-hexahydro-1H-indolo[5,4-b]indolyl)ethyl]guanidine sulfate.

The new and novel compounds of the present invention are prepared by the process which is exemplified by the following schematic diagram:

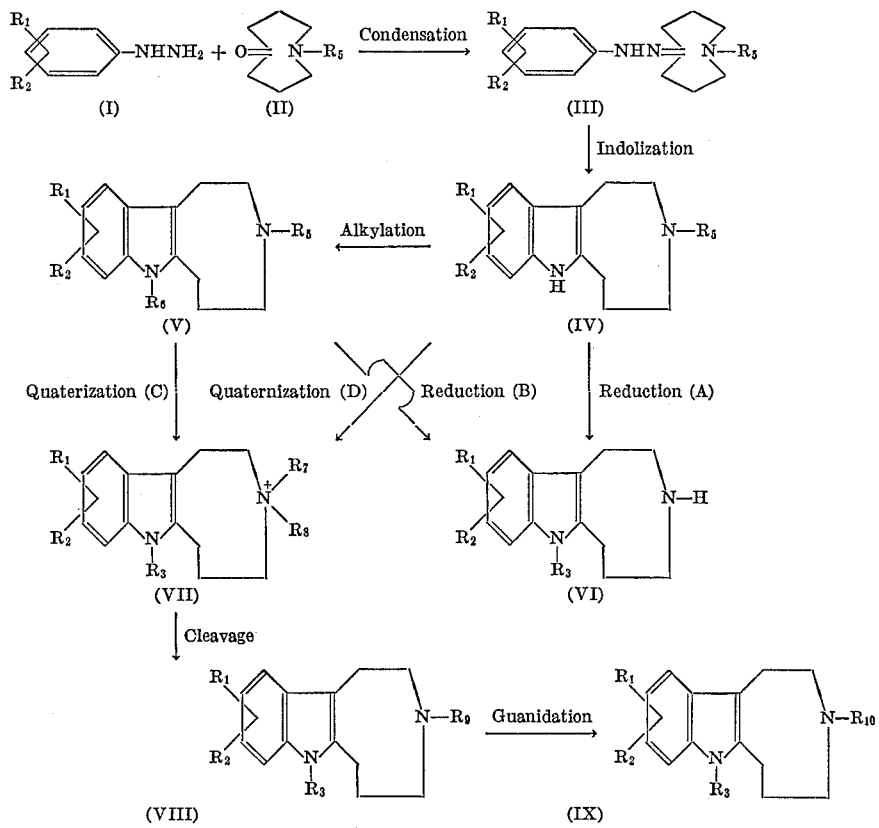

The new and novel compounds within the scope of the present invention are representatively exemplified by the following structural formula:

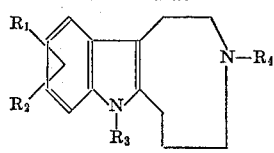

wherein $R_1$, $R_2$, and $R_3$ are defined as above; $R_5$ is selected from the group consisting of lower alkyl, cyclo(lower)alkyl and phen(lower)alkyl; $R_6$ is selected from the group consisting of lower alkyl, di(lower)alkylamino(lower)alkyl, phen(lower)alkyl, phen(lower)alkanoyl and halophen(lower)alkanoyl; $R_7$ is benzyl; $R_8$ is carbobenzoxyamino(lower)alkyl; $R_9$ is amino(lower)alkyl and $R_{10}$ is guanidinium(lower)alkyl.

The condensation reaction (see Examples II and III) is effected by contacting a phenyl hydrazine (I) with an appropriate 1-azacyclooct - 5 - one (II), preferably under an inert atmosphere, for a period of about one-half hour to about three hours at a temperature range from about 70° C. to about 100° C. Preferably this reaction is conducted under nitrogen at 100° C. for one hour. When the reaction is complete, the resulting 1-(1-azacyclooctan-5-one)-2-phenyl hydrazone (III) is reacted, as such, without purification in the following reaction.

The indolization reaction (see Examples IV and V) is effected by contacting the above-prepared 1-(1-azacyclooctan-5-one)-2-phenyl hydrazone (III) with a solution of an alkanolic mineral acid, preferably under an inert atmosphere, e.g. nitrogen at ambient temperature for a period of about five minutes to about two hours. Preferably this reaction is conducted in ethanolic hydrogen chloride under nitrogen for a period of about one-half hour.

When the indolization reaction is complete, the resulting 3-substituted-2,3,4,5,6,7-hexahydro-1H-indolo[5,4-b]-azocine mineral acid salt (IV) is recovered by conventional procedures. For example, the reaction mixture is evaporated under vacuum, the residue admixed with ice and a base e.g. ammonium hydroxide, the precipitate extracted into a water-immiscible organic solvent e.g. dichloromethane, the extract washed and dried and the residue chromatographically purified e.g. an alumina column using ether as an eluent.

In the above indolization reaction, if the benzenoid portion of the starting hydrazone (III) is unsymmetrically substituted ($R_1$ and/or $R_2$ are other than hydrogen), the resulting product contains a mixture of isomeric 3-substituted - 2,3,4,5,6,7 - hexahydro-1H-indolo[5,4-b]azocines (IV) which can be separated by procedures well known in the chemical arts e.g. chromatography, and fractional crystallization. A specific example of such a separation is hereinafter presented as Example VI.

The alkylation reaction (see Examples VII–IX) is effected by using standard procedures. One such method involves the reaction of a 3-substituted-2,3,4,5,6,7-hexahydro-1H-indolo[5,4-b]azocine (IV) with a ω-halo compound in the presence of lithium amide in toluene by the procedures described by I. A. Kaye et al. in the J. Amer. Chem. Soc. 71, 2322 (1949) and I. A. Kaye in the J. Amer. Chem. Soc. 73, 5891 (1951). Another procedure involves the reaction of a 3-substituted-2,3,4,5,6,7-hexahydro-1H-indolo[5,4-b]azocine (IV) with an alkyl iodide in the presence of sodium hydride in dimethylformamide by the method described by Herbst et al. in J. Med. Chem. 9, 864 (1966). When the alkylation reaction is complete, the resulting 3,7 - disubstituted - 2,3,4,5,6,7-hexahydro-1H-indolo[5,4-b]azocine (V) is easily separated by conventional methods.

The reduction reactions (A and B, see Examples X–XI) are effected by contacting either a 3-benzyl-2,3,4,5,6,7-hexahydro-1H-indolo[5,4-b]azocine (IV) or a 3-benzyl-7-substituted - 2,3,4,5,6,7 - hexahydro-1H-indolo[5,4-b]azocine (V) with a noble metal catalyst such as, platinum dioxide or about 2 percent to about 10 percent palladium on charcoal, under a hydrogen atmosphere of up to 50 p.s.i. (pound/square inch) in an alkanol at a temperature range from about 30° C. to about 60° C. for a period of about one-half hour to about twenty-four hours. Preferably this reaction is conducted in methanol using 10 percent palladium on charcoal under a hydrogen atmosphere of 50 p.s.i.

When the reduction is complete the product (VI), is separated by standard recovery procedures. For example, the reaction mixture is cooled, filtered, the filtrate evaporated, the residue is washed with a suitable solvent, such as ether, ether-alkanol, acetone, benzene and petroleum ether, and then recrystallized from an appropriate solvent e.g. and ether-alkanol mixture. When the starting material is a 3-benzyl-2,3,4,5,6,7-hexahydro-1H-indolo[5,4-b]-azocine (IV) the product of this reduction reaction (A) is the corresponding 2,3,4,5,6,7 - hexahydro - 1H-indolo-[5,4-b]azocine (VI). Alternatively, if the starting material is a 3 - benzyl - 7-substituted-2,3,4,5,6,7-hexahydro-1H-indolo[5,4-b]azocine (V), the product of the reduction (B) is the corresponding 7-substituted-2,3,4,5,6,7-hexahydro-1H-indolo[5,4-b]azocine (VI).

The quaternization reactions (C and D, see Example XII) are effected by contacting either a 3-benzyl-2,3,4,5,6,7-hexahydro-1H-indolo[5,4-b]azocine (IV) or a 7-substituted - 3 - benzyl - 2,3,4,5,6,7 - hexahydro - 1H - indolo-[5,4-b]azocine (V) with a ω-N-carbobenzoxyaminoalkyl halide in a reaction-inert solvent e.g. benzene, acetonitrile, toluene, xylene etc., under an inert atmosphere e.g. nitrogen, at a temperature range from about room temperature to aout reflux temperatures for a period of up to about thirty hours. Preferably this reaction is conducted under nitrogen in acetonitrile at reflux temperatures for a period of about twenty hours.

When the quaternization reaction is complete, the resulting quaternary salt (VII), is recovered by standard procedures. For example, the reaction mixture is cooled, added to ether and the quaternary salt separated by filtration. If the starting material is a 3-benzyl-2,3,4,5,6,7-hexahydro-1H-indolo[5,4-b]azocine (IV) the quaternization (C) product obtained is a 3-benzyl-3-(ω-N-carbobenzoxyaminoalkyl) - 2,3,4,5,6,7-hexahydro-1H-indolo[5,4-b]azocinium halide (VII). However, if the starting material is 7 - substituted - 3-benzyl-2,3,4,5,6,7-hexahydro-1H-indolo-[5,4-b]azocine (IV), the quaternization reaction (D) product is a 7-substituted-3-benzyl-3-(ω-N-carbobenzoxyaminoalkyl) - 2,3,4,5,6,7-hexahydro-1H-indolo[5,4-b]azocinium halide (VII).

The cleavage reaction (see Example XII) is effected by adding an above-prepared quaternary salt (VII) as a fine powder to liquid ammonia containing an alkanol followed by the subsequent addition of an alkali metal e.g. sodium, lithium and the like until a permanent blue solution is obtained. Thereafter, the solution is vigorously stirred for a short time, cautiously diluted with water, extracted with a water-immiscible solvent e.g. chloroform, the extract washed with brine and dried to afford the product (VIII) as a residue. In this reaction when the starting quaternary salt is a 3-benzyl-3-(ω-N-carbobenzoxyaminoalkyl) - 2,3,4,5,6,7-hexahydro-1H-indolo[5,4-b] azocinium halide (VII), the product is a 3-(ω-aminoalkyl) - 2,3,4,5,6,7 - hexahydro-1H-indolo[5,4-b]azocine (VIII) while a 7 - substituted - 3-benzyl-3-(ω-N-carbobenzoxyaminoalkyl - 2,3,4,5,6,7 - hexahydro-1H-indolo-[5,4-b]azocinium halide (VII) starting compound will afford the corresponding 7-substituted-3-(ω-aminoalkyl)-2,3,4,5,6,7-hexahydro-1H-indolo[5,4-b]azocine (VIII).

The guanidation reaction (see Examples XIII and XIV) is effected by contacting an above-prepared 7-substituted or 7 - unsubstituted - 3-(ω-aminoalkyl)-2,3,4,5,6,7-hexahydro 1H-indolo[5,4-b]azocine (VIII) with an appropriate urea mineral acid salt, under an inert atmosphere e.g. nitrogen, at temperatures sufficient to produce a homogenous melt. Thereafter, the melt is cooled, triturated with ether, dissolved in a suitable solvent e.g. acetone and reprecipitated with ether to afford the corresponding [ω-(7 - [substituted or unsubstituted]-2,3,4,5,6,7-hexahydro-1H - indolo[5,4-b]azocinyl)alkyl]guanidine mineral acid salt (IX) which can be converted to its free base by conventional procedures.

Since many of the compounds of the present invention are basic, in particularly, those designated by structural formulae (IV), (V), (VI), (VIII) and (IX), advantage may be taken of the water solubility of salts of these compounds formed with acids in the isolation and/or purification of the above compounds and in the preparation of aqueous solutions of these new compounds for oral or parenteral administration. Of course, only salts formed with pharmacologically-acceptable acids should be employed in biological applications. Particularly effective salts are those formed with pharmacologically-acceptable acids having a pK value of 3 or lower. Such acids are well known in the art, for example, hydrochloric, hydrobromic, sulfuric, nitric, phosphoric, benzenesulfonic, toluene-sulfonic, methylsulfonic, ethylsulfonic acids and the like. These salts may be prepared by procedures commonly employed in the art, for example, reacting the compound with an equivalent of the selected acid in aqueous solution and concentration of the solution. Other known procedures may also be employed.

The new and novel 3-substituted-2,3,4,5,6,7-hexahydro-1H-indolo[5,4-b]azocines (IV); 3,7-disubstituted-2,3,4,5,6,7 - hexahydro-1H-indolo[5,4-b]azocines (V); 7-(substituted or unsubstituted) - 2,3,4,5,6,7-hexahydro-1H-indolo-[5,4-b]azocines (VI); 7-(substituted or unsubstituted)-3-(ω-aminoalkyl) - 2,3,4,5,6,7-hexahydro-1H-indolo[5,4-b]azocines (VII); and [ω-(7-[substituted or unsubstituted]-2,3,4,5,6,7 - hexahydro - 1H-indolo[5,4-b]azocinyl)alkyl] guanidines (IX) of the present invention possess valuable pharmacological activity. In particular, these compounds in standard pharmacological procedures demonstrate nervous system activity and are useful as depressants. Because of this property they are of importance in producing a calming effect in animals.

In the pharmacological evaluation of the central nervous system depressant compounds of this invention the in vivo effects of the compounds of this invention are tested as follows:

The compound is administered intraperitoneally to three mice (14 to 24 grams) at each of the following dose: 400, 127, 40 and 12.7 mg./kg. The animals are watched for a minimum of two hours during which time signs of general stimulation (i.e., increased spontaneous motor activity, hyper-activity on tactile stimulation, twitching), general depression (i.e., decreased spontaneous motor activity, decreased respiration) and autonomic activity (i.e., miosis, mydriasis, diarrhea) are noted. The animals are tested for changes in reflexes (i.e., flexor, extensor) and are rated by use of a pole climb and inclined screen for the presence of sedation-ataxia. The "Eddy Hot-Plate Method" [Nathan B. Eddy and Dorothy Leimbach, J. Pharmacol. Exper. Therap. 107, 385 (1953)] is used to test for analgesia. The experiment is terminated by subjecting each animals to a maximal electroshock to test for anti-convulsant activity.

The compounds of this invention represented by structural Formulae IV, V, VI and VII in the above test procedure induce decreased motor activity at 127 mg./kg. There were no deaths in the test animals at this dose, 127 mg./kg., intraperitoneally.

When the compounds of this invention are employed as central nervous system depressants they may be administered to warm-blooded animals, e.g. mice, rats, rabbits, dogs, cats, monkeys, etc. alone or in combination with pharmacologically-acceptable carriers, the proportion of which is determined by the solubility and chemical nature of the compound, chosen route of administration and standard biological practice. For example, they may be administered orally in the solid form containing such excipients as starch, milk sugar, certain types of clay and so forth. They may also be administered orally in the form of solutions or they may be injected parenterally. For parenteral administration they may be used in the form of a sterile solution containing other solutes, for example, enough saline or glucose to make the solution isotonic.

The dosage of the present central nervous system depressants will vary with the form of administration and the particular compound chosen. Furthermore, it will vary with the particular subject under treatment. Generally, treatment is initiated with small dosages substantially less than the optimum dose of the compound. Thereafter, the dosage is increased by small increments until the optimum effect under the circumstances is reached. In general, the compounds of this invention are most desirably administered at a concentration level that will generally afford effective results without causing any harmful or deleterious side effects.

Some of the compounds [(IV), (V), (VII) and (VIII)] of this invention are also useful and have utility as intermediates in the preparation of still other compounds of the present invention. In this regard, the 3-substituted-2,3,4,5,6,7-hexahydro-1H-indolo[5,4-b]azocines (IV) are useful intermediates in the preparation of compounds represented by structural Formulae V, VI, VII, VIII and IX; the 3,7-disubstituted-2,3,4,5,6,7-hexahydro-1H-indolo[5,4-b]azocines are useful intermediates in the preparation of compounds represented by structural Formulae VI, VII, VIII and IX; the 7-(substituted or unsubstituted)-3-benzyl-3 - (ω-N-carbobenzoxyaminoalkyl-2,3,4,5,6,7-hexahydro-1H-indolo[5,4-b]azocinium halide (VII) are useful intermediates in the preparation of compounds represented by structural Formulae VIII and IX; and the 7-substituted or unsubstituted)-3-(ω-aminoalkyl)-2,3,4,5,6,7-hexahydro-1H-indolo[5,4-b]azocines (VIII) are useful intermediates in the preparation of the compounds represented by structural Formula IX.

The 1-azacyclooct-5-one (II) compounds employed as starting materials in the synthesis of the compounds of this invention are prepared by the procedures described by Leonard et al. in J. Amer. Chem. Soc. 76, 630, 5708 (1954); Leonard et al. in J. Amer. Chem. Soc. 77, 6245 (1955); Leonard et al. in J. Amer. Chem. Soc. 77, 6234 (1955), as exemplified in hereinafter Example I. The phenyl hydrazines (I) reactants are either available from commercial sources or prepared by procedures well known in the chemical arts.

The following examples are given by way of illustration and are not to be construed as limitations of this invention, many variations of which are possible without departing from the scope and spirit thereof.

EXAMPLE I

A mixture of triethylamine (178 g., 1.75 mole), benzylamine (78.5 g., 7.25×10⁻¹ moles), γ-iodo methylbutyrate (400 g., 1.75 moles) and acetonitrile (1050 ml.) are refluxed under nitrogen for fifteen hours. The acetonitrile is removed under reduced pressure and the residue distributed between ether and a ten percent potassium carbonate solution. The ether layer is washed with brine, dried

$(Na_2SO_4)$ and portionally distilled. The fraction B.P. 184–195° C. (111 g.) consists of dimethyl-γ,γ-benzylimino-bis-butyrate.

The Dieckmann ring-closure is run in a nitrogen atmosphere using high dilution conditions. To a vigorously stirred and refluxing suspension of sodium hydride (12.5 g., 50% oil dispersion, 2.6×10⁻¹ moles) in dry xylene (3 liters), there is added five drops of methanol followed by the addition of a solution of dimethyl-γ,γ′-benzylimino-bis-butyrate (30 g., 1×10⁻¹ mole) in xylene (470 ml.) during forty hours. Following the additions, xylene (2 liters) is distilled off and the residue cooled and treated cautiously with ice-water followed by excess 1 N hydrochloric acid. Vigorous stirring gradually results in virtually complete solution of the tarry precipitate. The aqueous acid extracts are basified with solid potassium carbonate and extracted exhaustively with dichloromethane. The organic extracts are evaporated to afford 26 g. residue. Thereafter, the residue (24 g.) in 187.5 ml. 6 N hydrochloric acid is refluxed under nitrogen for four hours, cooled and basified with solid potassium carbonate. The resulting 1 - benzyl-1-azacyclooct-5-one is extracted with dichloromethane, and dried, B.P. 144–150° C. at 1 mm. yield 3.1 g. (15%). IR (CHCl₃) 1692 cm.⁻¹.

EXAMPLE II

The 1-benzyl-1-azacyclooct-5-one (3.05 g., 1.4×10⁻² moles) as prepared in Example I, is admixed with phenylhydrazine (1.65 g., 1.52×10⁻² moles) and then heated under nitrogen for one hour at 100° C. to afford 1-(1-benzyl-1-azacyclooctan-5-one) - 2-phenylhydrazone, $\lambda_{max}$ 280 mμ.

EXAMPLE III

Repeating the procedure of Example II to condense the following reactants, the hereinafter listed hydrazones are obtained:

| Reactants | Products |
| --- | --- |
| 1-methyl-1-azacyclooct-5-one and 1-(p-methoxyphenyl) hydrazine. | 2-(p-methoxyphenyl)-1-(1-methyl-1-azacyclooctan-5-one)hydrazone. |
| 1-cyclopropyl-1-azacyclooct-5-one and 1-(2,4-dichlorophenyl)hydrazine. | 2-(2,4-dichlorophenyl)-1-(1-cyclopropyl-1-azacyclooctan-5-one)-hydrazone. |
| 1-cyclohexyl-1-azacyclooct-5-one and 1-(p-tolyl)hydrazine. | 1-(1-cyclohexyl-1-azacyclooct-5-one)-2-(p-tolyl)hydrazone. |
| 1-butyl-1-azacyclooct-5-one and 1-(m-bromophenyl)hydrazine. | 2-(m-bromophenyl)-1-(1-butyl-1-azacyclooct-5-one)hydrazone. |
| 1-ethyl-1-azacyclooct-5-one and 1-(2,4-diethoxyphenyl)hydrazine. | 2-(2,4-diethoxyphenyl)-1-(1-ethyl-1-azacyclooct-5-one)hydrazone. |
| 1-propyl-1-azacyclooct-5-one and 1-(4-ethyl-2-fluorophenyl)-hydrazine. | 2-(4-ethyl-2-fluorophenyl)-1-(1-propyl-1-azacyclooct-5-one)hydrazone. |
| 1-cyclobutyl-1-azacyclooct-5-one and (m-ethylphenyl)hydrazine. | 1-(1-cyclobutyl-1-azacyclooct-5-one)-2-(m-ethylphenyl)hydrazone. |
| 1-(3-phenpropyl)-1-azacyclooct-5-one and (2,4-dimethylphenyl)hydrazine. | 2-(2,4-dimethylphenyl)-1-[1-(3-phenpropyl)-1-azacyclooct-5-one]hydrazone. |
| 1-cyclopentyl-1-azacyclooct-5-one and (p-butylphenyl)hydrazine. | 2-(p-butylphenyl)-1-(1-cyclopentyl-1-azacyclooct-5-one)hydrazone. |
| 1-benzyl-1-azacyclooct-5-one and (p-propoxyphenyl)hydrazine. | 1-(1-benzyl-1-azacyclooct-5-one)-2-(p-propoxyphenyl)hydrazone. |
| 1-(2-phenethyl)-1-azacyclooct-5-one and phenylhydrazine. | 1-[1-(2-phenethyl)-1-azacyclooct-5-one]-2-phenylhydrazone. |
| 1-methyl-1-azacyclooct-5-one and 1-(3,5-dichlorophenyl)hydrazine. | 2-(3,5-dichlorophenyl)-1-methyl-1-azacyclooctan-5-one)hydrazone. |

EXAMPLE IV

All of the 1 - (1 - benzyl - 1 - azacyclooctan - 5 - one)-2-phenylhydrazone prepared in Example II is treated with a 10 percent ethanolic hydrochloric acid (60 ml.) under a nitrogen atmosphere for thirty minutes. The solvent is then largely removed by distillation under reduced pressure and the residue poured into a mixture of ice and ammonium hydroxide. The precipitate is extracted into dichloromethane and the organic layer washed with brine, and dried ($K_2CO_3$). The residue is purified by filtration in ether through an alumina column and eluted with the same solvent. Addition of isopropanolic hydrogen chloride to the eluate and trituration of the precipitate with boiling acetone affords crystalline 3-benzyl-2,3,4,5,6,7 - hexahydro - 1H - indolo[5,4 - b]azocine, hydrochloride (3.9 g.) M.P. 227° C. An analytical sample is recrystallized from 95% ethanol, M.P. 235° C. (with effervescence). Ultra Violet Absorption: $\gamma_{max}$ 223 (34,600), 274 infl. (6250), 281 (6900) and 289 m$\mu$ ($\epsilon$ 6100).

Analysis.—Calc'd for $C_{20}H_{22}N_2 \cdot HCl$ (326.86) (percent): C, 73.49; H, 7.09; N, 8.57; Cl, 11.04. Found (percent): C, 73.34; H, 7.02; N, 8.37; Cl, 11.04.

Contacting the above-prepared hydrochloride with a 10 percent aqueous sodium hydroxide solution, there is afforded the corresponding base.

EXAMPLE V

When the process of Example IV is repeated to inrolize the hydrazones of Example III the following 3-substituted - 2,3,4,5,6,7 - hexahydro - 1H - indolo[5,4 - b] azocines or mixtures thereof are prepared as their hydrochloride salts:

2,3,4,5,6,7-hexahydro-10-methoxy-3-methyl-1H-indolo[5,4-b]azocine;

8,10-dichloro-3-cyclopropyl-2,3,4,5,6,7-hexahydro-1H-indolo[5,4-b]azocine;

3-cyclohexyl-2,3,4,5,6,7-hexahydro-10-methyl-1H-indolo[5,4-b]azocine;

9-bromo-3-butyl-2,3,4,5,6,7-hexahydro-1H-indolo[5,4-b]azocine and 11-bromo-3-butyl-2,3,4,5,6,7-hexahydro-1H-indolo[5,4-b]azocine;

8,10-diethoxy-3-ethyl-2,3,4,5,6,7-hexahydro-1H-indolo[5,4-b]azocine;

10-ethyl-8-fluoro-2,3,4,5,6,7-hexahydro-3-propyl-1H-indolo[5,4-b]azocine;

3-cyclobutyl-9-ethyl-2,3,4,5,6,7-hexahydro-1H-indolo[5,4-b]azocine and 3-cyclobutyl-11-ethyl-2,3,4,5,6,7-hexahydro-1H-indolo[5,4-b]azocine;

2,3,4,5,6,7-hexahydro-8,10-dimethyl-3-(3-phenpropyl)-1H-indolo[5,4-b]azocine;

10-butyl-3-cyclopentyl-2,3,4,5,6,7-hexahydro-1H-indolo[5,4-b]azocine;

3-benzyl-2,3,4,5,6,7-hexahydro-10-propoxy-1H-indolo[5,4-b]azocine;

2,3,4,5,6,7-hexahydro-3-(2-phenethyl)-1H-indolo[5,4-b]azocine; and 3-methyl-2,3,4,5,6,7-hexahydro-9,11-dichloro-1H-indolo[5,4-b]azocine.

EXAMPLE VI

The isometric mixture containing the hydrochloride salts of 2,3,4,5,6,7 - hexahydro - 9 - ethyl - 3 - ethyl - 3-methyl - 1H - indolo[5,4-b]azocine and 2,3,4,5,6,7 - hexahydro - 11 - ethyl - 3 - methyl - 1H - indolo[5,4-b]azocine, as prepared in Example IV, is dissolved in a mixture of benzene-petroleum ether (1:1) and filtered on an alumina column. Initially non-crystallizing impurities are eluted with a benzene-petroleum ether mixture (1:1. Then with benzene an isomer is eluted which on crystallization affords 2,3,4,5,6,7 - hexahydro - 9 - ethyl - 3 - methyl-1H - indolo[5,4 - b]azocine hydrochloride. Further substance is eluted with a benzene-ether mixture (7:1) from which 2,3,4,5,6,7 - hexahydro - 11 - ethyl - 3 - methyl-1H-indolo[5,4-b]azocine hydrochloride separates.

In a similar manner, all the isomeric mixtures of Example IV are separated.

EXAMPLE VII

The product of Example IV, 3 - benzyl - 2,3,4,5,6,7-hexahydro - 1H - indolo[5,4 - b]azocine hydrochloride (2.95 g.) is reconverted to the free base (2.7 g., $9.45 \times 10^{-3}$ moles) and dissolved in toluene (350 ml.). The solution is azeotroped to a volume of 175 ml. Lithium amide (0.31 g., $1.35 \times 10^{-3}$ moles) is added and the reaction refluxed under nitrogen for one and a quarter hours. $\gamma$-Chloropropyldimethylamine (2.0 g., $165 \times 10^{-2}$ moles) in toluene (25 ml.) is then added dropwise during two hours and the resulting reaction mixture refluxed for another ten hours. Toluene is removed under reduced pressure and the residue distributed between ether and 2 N hydrochloric acid. The ether layer is washed with 2 N hydrochloric acid, water and rejected. The combined aqueous acid extracts are washed with ether, basified strongly with 10% potassium carbonate solution and extracted with dichloromethane (three times). The organic layer is washed with brine, dried ($Na_2SO_4$) and stripped to afford a residue which is purified by filtration through a column of alumina and eluted with ether. Addition of isopropanolic hydrogen chloride to the eluate affords 3-benzyl - 7 - (3 - dimethylaminopropyl) - 2,3,4,5,6,7-hexahydro - 1H - indolo[5,4 - b]azocine hydrochloride, as a white hygroscopic amorphous solid (3.4 g.).

EXAMPLE VIII

3 - benzyl - 2,3,4,5,6,7 - hexahydro-1H-indolo[5,4-b] azocine (1.15 g., $4 \times 10^{-3}$ moles) is stirred for one hour at 25° C. in dimethylformamide (20 mls.) containing sodium hydride (210 mgs. of a mineral oil dispersion, $4.7 \times 10^{-3}$ moles). Methyl iodide (625 mg., $4.4 \times 10^{-3}$ moles) in dimethylformamide (2 mls.) is added and the mixture stirred at room temperature for sixteen hours. The dimethylformamide is removed by distillation, and the residue dissolved in chloroform, washed with sodium bicarbonate, water and dried. The product is chromatographed on neutral alumina to give 3-benzyl-7-methyl-2,3,4,5,6,7-hexahydro-1H-indolo[5,4-b] azocine as a clear oil (500 mg.). The base is converted by dissolution in ether and treatment with isopropanolic hydrogen chloride to the hydrochloride salt.

EXAMPLE IX

When the procedure of Examples VII–VIII are repeated to alkylate appropriate 3 - substituted-2,3,4,5,6,7-hexahydro-1H-indolo[5,4-b]azocines, the following 3,7-disubstituted - 2,3,4,5,6,7 - hexahydro - 1H-indolo[5,4-b]azocines are prepared as their hydrochloride salts:

7-(3-dimethylaminopropyl)-2,3,4,5,6,7-hexahydro-10-methoxy-3-methyl-1H-indolo[5,4-b]azocine;
3-cyclopropyl-8,10-dichloro-2,3,4,5,6,7-hexahydro-7-(2-dimethylaminoethyl)-1H-indolo[5,4-b]-azocine;
3-cyclohexyl-2,3,4,5,6,7-hexahydro-7,10-dimethyl-1H-indolo[5,4-b]azocine;
9-bromo-3-butyl-7-ethyl-2,3,4,5,6,7-hexahydro-1H-indolo[5,4-b]azocine;
8,10-diethoxy-3-ethyl-2,3,4,5,6,7-hexahydro-7-propyl-1H-indolo[5,4-b]azocine;
7-benzyl-10-ethyl-8-fluoro-2,3,4,5,6,7-hexahydro-3-propyl-1H-indolo[5,4-b]azocine;
3-cyclobutyl-9-ethyl-2,3,4,5,6,7-hexahydro-7-(2-phenethyl)-1H-indolo[5,4-b]azocine;
7-benzoyl-2,3,4,5,6,7-hexahydro-8,10-dimethyl-3-(3-phenpropyl)-1H-indolo[5,4-b]azocine;
3-benzyl-2,3,4,5,6,7-hexahydro-7-(3-phenpropyl)-1H-indolo[5,4-b]azocine;
2,3,4,5,6,7-hexahydro-10-methoxy-3-methyl-7-phenacetyl-1H-indolo[5,4-b]azocine;
7-(p-chlorobenzoyl)-3-cyclohexyl-2,3,4,5,6,7-hexahydro-10-methyl-1H-indolo[5,4-b]azocine; and
3-benzyl-7-[4-(p-fluorophenyl)butyryl]-2,3,4,5,6,7-hexahydro-1H-indolo[5,4-b]azocine.

EXAMPLE X

3 - benzyl-2,3,4,5,6,7-hexahydro-1H-indolo[5,4-b]azocine hydrochloride (0.86 g.) in methanol (50 ml.) is hydrogenated at 50° C. and 50 p.s.i. using a 10 percent palladium on carbon catalyst (250 mg.) for five hours. The reaction is allowed to cool to room temperature overnight, filtered from the catalyst and the filtrate evaporated. The residue on trituration with ether crystallizes to afford 550 mg. product. Recrystallization from methanol-ether afforded 400 mg. of 2,3,4,5,6,7-hexahydro-1H-indolo[5,4-b]azocine hydrochloride, M.P. 280–300° C. (Kofler). Ultra Violet Absorption: $\lambda_{max.}$ 223 (32,800), 274 infl. (6750), 281 (7050), 289 m$\mu$ ($\epsilon$6300).

*Analysis.*—Calc'd. for $C_{13}H_{17}N_2 \cdot HCl$ (236.75) (percent): C, 65.98; H, 7.24; N, 11.84; Cl, 14.98. Found (percent): C, 65.80; H, 7.50; N, 12.09; Cl, 15.30.

When the above reduction is repeated starting with separated 3 - benzyl-2,3,4,5,6,7-hexahydro-1H-indolo[5,4-b]azocine hydrochlorides prepared as in Example V, the following products are obtained:

2,3,4,5,6,7-hexahydro-10-methoxy-1H-indolo [5,4-b]azocine;
8,10-dichloro-2,3,4,5,6,7-hexahydro-1H-indolo [5,4-b]azocine;
9,11-dichloro-2,3,4,5,6,7-hexahydro-1H-indolo [5,4-b]azocine;
2,3,4,5,6,7-hexahydro-10-methyl-1H-indolo [5,4-b]azocine;
8,10-diethoxy-2,3,4,5,6,7-hexahydro-1H-indolo [5,4-b]azocine;
10-ethyl-8-fluoro-2,3,4,5,6,7-hexahydro-1H-indolo [5,4-b]azocine;
8-ethyl-2,3,4,5,6,7-hexahydro-1H-indolo[5,4-b] azocine;
9-ethyl-2,3,4,5,6,7-hexahydro-1H-indolo[5,4-b] azocine;
10-ethyl-2,3,4,5,6,7-hexahydro-1H-indolo[5,4-b] azocine;
2,3,4,5,6,7-hexahydro-8,10-dimethyl-1H-indolo[5,4-b] azocine;
2,3,4,5,6,7-hexahydro-9,11-dimethyl-1H-indolo[5,4-b] azocine;
10-butyl-2,3,4,5,6,7-hexahydro-1H-indolo[5,4-b] azocine;
2,3,4,5,6,7-hexahydro-10-propoxy-1H-indolo[5,4-b] azocine; and
2,3,4,5,6,7-hexahydro-1H-indolo[5,4-b]azocine.

EXAMPLE XI

3 - benzyl - 7 - (3 - dimethylaminopropyl)-2,3,4,5,6,7-hexahydro - 1H - indolo[5,4-b]azocine hydrochloride, as prepared in Example VII, in methanol (160 ml.) is hydrogenated at 50° C. and 50 p.s.i. using ten percent palladium on carbon for five hours. The reaction is allowed to cool to room temperature overnight, filtered from the catalyst and the filtrate evaporated. Trituration of the residue with an ether-methanol mixture affords the product (2.4 g.). The analytical sample (1.9 g.), M.P. 268–270° C. (Kofler) is recrystallized from ether-methanol to afford 2,3,4,5,6,7 - hexahydro - 7-(3-dimethylaminopropyl)-1H-indolo[5,4-b]azocine dihydrochloride, Ultra Violet Absorption $\lambda_{max.}$ 226 (31,700), 278 infl. (6750), 283.5 (7550), 292 m$\mu$ ($\epsilon$ 6900).

*Analysis.*—Calc'd for $C_{18}H_{29}N_3Cl_2$ (358.34) (percent): C, 60. 33; H, 8.16; N, 11.73; Cl, 19.79. Found (percent): C, 60.12; H, 7.96; N, 11.91; Cl, 19.53.

Similarly, appropriately prepared 3-benzyl-7-substituted-2,3,4,5,6,7 - hexahydro - 1H-indolo[5,4-b]azocines are reduced to afford the following 7-substituted-2,3,4,5,6,7-hexahydro-1H-indolo[5,4-b]azocines:

8,10-dichloro-2,3,4,5,6,7-hexahydro-7-(2-dimethyl-aminoethyl)-1H-indolo[5,4-b]azocine;
8,10-diethoxy-2,3,4,5,6,7-hexahydro-7-propyl-1H-indolo[5,4-b]azocine;
8-ethyl-2,3,4,5,6,7-hexahydro-7-(2-phenethyl)-1H-indolo[5,4-b]azocine;
7-benzoyl-2,3,4,5,6,7-hexahydro-8,10-dimethyl-1H-indolo[5,4-b]azocine;
2,3,4,5,6,7-hexahydro-7-(3-phenpropyl)-1H-indolo[5,4-b]azocine;
2,3,4,5,6,7-hexahydro-10-methoxy-7-phenacetyl-1H-indolo[5,4-b]azocine;
9,11-dichloro-2,3,4,5,6,7-hexahydro-7-(3-phenpropionyl)-1H-indolo[5,4-b]azocine;
7-(p-chlorobenzoyl)-2,3,4,5,6,7-hexahydro-10-methyl-1H-indolo[5,4-b]azocine; and
7-[4-(p-fluorophenyl)butyryl]-2,3,4,5,6,7-hexahydro-1H-[5,4-b]azocine.

EXAMPLE XII

3 - benzyl - 2,3,4,5,6,7 - hexahydro-1H-indolo[5,4,b]-azocine hydrochloride (3.0 g.), as prepared in Example IV, is reconverted to the free base (2.7 g., $9.45 \times 10^{-3}$ moles) and refluxed for twenty hours under nitrogen with acetonitrile (20 mls.) containing 2-N-carbobenzoxyaminoethyl iodide (3.5 g., $1.15 \times 10^{-2}$ moles). The cooled mixture is added to ether to afford the solid product (4 g.), 3 - benzyl - 3-(2-N-carbobenzoxyaminoethyl)-2,3,4,5,6,7-hexahydro-1H-indolo[5,4-b]azocinium iodide. The quaternary salt is used directly without purification.

The above-prepared quaternary salt (4 g., $6.75 \times 10^{-3}$ moles) is added as a fine powder to liquid ammonia (2 liters) containing 1-methoxy-2-propanol (2.5 ml.). Lithium (190 mg., $2 \times 10^{-2}$ moles) is added portionwise until a permanent blue solution is obtained. After stirring vigorously for four minutes, the solution is diluted cautiously with hot water and extracted with chloroform. The extract is washed with brine, dried ($Na_2SO_4$) and stripped to an oily residue of 3-(2-aminoethyl)-2,3,4,5,6,7-hexahydro-1H-indolo[5,4-b]azocine. The hydrochloride is obtained by the addition of isopropanolic hydrogen chloride to an ether solution of the product.

In a similar manner, appropriate 7-(substituted or unsubstituted) - 3 - benzyl-2,3,4,5,6,7-hexahydro-1H-indolo-

[5,4-b]azocines are quaternized and then cleaved to afford the following compounds:

3-(2-aminoethyl)-2,3,4,5,6,7-hexahydro-8,10-dimethyl-1H-indolo[5,4-b]azocine;
3-(2-aminoethyl)-2,3,4,5,6,7-hexahydro-9-propoxy-1H-indolo[5,4-b]azocine;
3-(3-aminopropyl)-2,3,4,5,6,7-hexahydro-9,11-dimethyl-1H-indolo[5,4-b]azocine;
3-(2-aminoethyl)-2,3,4,5,6,7-hexahydro-10-propoxy-1H-indolo[5,4-b]azocine;
3-(4-aminobutyl)-7-(3-dimethylaminopropyl)-2,3,4,5,6,7-hexahydro-1H-indolo[5,4-b]azocine;
3-(5-aminopentyl)-7-methyl-2,3,4,5,6,7-hexahydro-1H-indolo[5,4-b]azocine;
3-(2-aminoethyl)-2,3,4,5,6,7-hexahydro-7-(3-phenpropyl)-1H-indolo[5,4-b]azocine; and
3-(2-aminoethyl)-7-[4-(p-fluorophenyl)butyryl]-2,3,4,5,6,7-hexahydro-1H-indolo[5,4-b]azocine.

EXAMPLE XIII

A mixture of 3-(2-aminoethyl)-2,3,4,5,6,7-hexahydro-1H-indolo[5,4-b]azocine (1.1 g., 4.5×10⁻³ moles) and finely powdered 3,5 - dimethylpyrrolo - 1-carboxamidine nitrate (650 mg., 3.25×10⁻³ moles) under nitrogen is treated (sudden immersion) in an oil bath at 130° C. for thirty minutes. The cooled melt is triturated with boiling ether (three times), dissolved in acetone and re-precipitated with ether to give [2-(2,3,4,5,6,7-hexahydro-1H-indolo[5,4-b]azocinyl)ethyl]guanidine nitrate (800 mg.). Infra Red Absorption 1665 and 1625 cm.⁻¹ (monosubstituted guanidine I and II bands).

In like manner, the following compounds are prepared:

[2-(2,3,4,5,6,7-hexahydro-9,11-dimethyl-1H-indolo-[5,4-b]azocinyl)propyl]guanidine nitrate;
[2-(2,3,4,5,6,7-hexahydro-10-propoxy-1H-indolo-[5,4-b]azocinyl)ethyl]guanidine nitrate;
[4-(2,3,4,5,6,7-hexahydro-7-[3-dimethylaminopropyl]-1H-indolo[5,4-b]azocinyl)butyl]quanidine nitrate; and
[2-(2,3,4,5,6,7-hexahydro-7-phenpropyl]-1H-indolo-[5,4-b]azocinyl)ethyl] guanidine nitrate.

EXAMPLE XIV 3-(2-aminoethyl) - 2,3,4,5,6,7 - hexahydro - 1H - indolo-[5,4-b]azocine (1.5 g., 6.1×10⁻³ moles) and methylthiopseudourea sulfate (860 ml., 3.1×10⁻³ moles) are dissolved in water (5 ml.) and the mixture refluxed overnight. Evolution of methyl mercaptan takes place. On cooling, the solid that separated is triturated with ethanol-hexane to give [2-(2,3,4,5,6,7-hexahydro - 1H - indolo-[5,4-b]azocinyl)ethyl]guanidine sulfate.

In the same manner, the following compounds are prepared:

[2-(2,3,4,5,6,7-hexahydro-8,10-dimethyl-1H-indolo-[5,4-b]azocinyl)ethyl]guanidine sulfate;
[2-(2,3,4,5,6,7-hexahydro-9-propoxy-1H-indolo[4,5-b]azocinyl)ethyl]guanidine sulfate;
[5-(2,3,4,5,6,7-hexahydro-7-methyl-1H-indolo[5,4-b]azocinyl)pentyl]guanidine sulfate; and
[2-([4-(p-fluorophenyl)butyryl]-2,3,4,5,6,7-hexahydro-1H-indolo[5,4-b]azocinyl)ethyl]guanidine sulfate.

What is claimed is:
1. A compound selected from the group consisting of those having the formula:

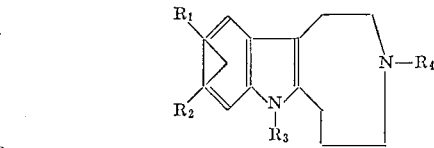

wherein $R_1$ and $R_2$ are both selected from the group consisting of hydrogen, halogen, lower alkyl, and lower alkoxy; $R_3$ is selected from the group consisting of lower alkyl, lower di(lower)alkylamino(lower)alkyl, phen(lower)alkanoyl, and halophen(lower)alkanoyl; $R_4$ is selected from the group consisting of hydrogen, lower alkyl, cyclo(lower)alkyl, phen(lower)alkyl and amino(lower)alkyl; and the pharmacologically acceptable acid addition salts thereof.

2. A compound as set forth in claim 1, which is: 3-benzyl-7-(3-dimethylaminopropyl) - 2,3,4,5,6,7 - hexahydro-1H-indolo[5,4-b]azocine hydrochloride.

3. A compound as set forth in claim 1, which is: 7-(3-dimethylaminopropyl) - 2,3,4,5,6,7 - hexahydro-1H-indolo[5,4-b]azocine dihydrochloride.

4. A compound selected from the group consisting of those having the formula:

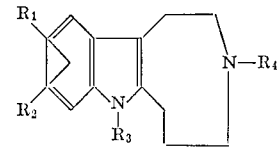

wherein $R_1$ and $R_2$ are both selected from the group consisting of hydrogen, halogen, lower alkyl, and lower alkoxy; $R_3$ is selected from the group consisting of hydrogen, lower alkyl, lower di(lower)alkylamino(lower)alkyl, phen(lower)alkyl, phen(lower)alkanoyl, and halophen(lower)alkanoyl; $R_4$ is guanidinium(lower)alkyl; and the pharmacologically acceptable acid addition salts thereof.

5. A compound as set forth in claim 4, which is: [2-(2,3,4,5,6,7-hexahydro - 1H - indolo[5,4-b]azocin-3-yl)ethyl]guanidine nitrate.

6. A compound as set forth in claim 4, which is: [2-(2,3,4,5,6,7-hexahydro - 1H - indolo[5,4-b]azocin-3-yl)ethyl]guanidine sulfate.

References Cited
UNITED STATES PATENTS 3,419,569   12/1968   Renner _____ 260—296
3,478,051   11/1969   Houlihan et al. ____ 260—326.12

OTHER REFERENCES

Burger: Medicinal Chemistry (2nd ed.), 1960, p. 672.

ALEX MAZEL, Primary Examiner

J. A. NARCAVAGE, Assistant Examiner

U.S. Cl. X.R.

260—239 B, 326.5 B; 424—274